(12) United States Patent
Benedetti et al.

(10) Patent No.: US 12,434,778 B2
(45) Date of Patent: Oct. 7, 2025

(54) DEVICE FOR SUPPORTING CABLES FOR ARTICULATED VEHICLES

(71) Applicant: P.E.I. PROTEZIONI ELABORAZIONI INDUSTRIALI S.R.L., Calderara di Reno (IT)

(72) Inventors: Michele Benedetti, Casalecchio di Reno (IT); Vittorio Mardegan, San Giovanni in Croce (IT)

(73) Assignee: P.E.I. PROTEZIONI ELABORAZIONI INDUSTRIALI S.R.L., Calderara di Reno (IT)

(*) Notice: Subject to any disclaimer, the term of this patent is extended or adjusted under 35 U.S.C. 154(b) by 590 days.

(21) Appl. No.: 17/878,381

(22) Filed: Aug. 1, 2022

(65) Prior Publication Data

US 2023/0043722 A1   Feb. 9, 2023

(30) Foreign Application Priority Data

Aug. 3, 2021 (IT) .................. 102021000020978

(51) Int. Cl.
*B62D 47/02* (2006.01)
*B60D 1/62* (2006.01)

(52) U.S. Cl.
CPC ............. *B62D 47/025* (2013.01); *B60D 1/62* (2013.01)

(58) Field of Classification Search
CPC .................................. B60D 1/62; B62D 47/025
See application file for complete search history.

(56) References Cited

FOREIGN PATENT DOCUMENTS

| CN | 110504654 A | * | 11/2019 | ............... B60D 1/62 |
|---|---|---|---|---|
| EP | 3208170 A1 | * | 8/2017 | ............... B60D 1/64 |
| EP | 3354495 A1 | | 8/2018 | |
| EP | 3569426 A1 | * | 11/2019 | ............... B60D 1/62 |
| EP | 3718795 A1 | * | 10/2020 | ............... B60D 1/62 |
| PL | 3354495 T3 | | 6/2021 | |

OTHER PUBLICATIONS

Polish Office Action dated Nov. 29, 2023 from counterpart PL App No. 441911.

* cited by examiner

*Primary Examiner* — Kevin Hurley
(74) *Attorney, Agent, or Firm* — SHUTTLEWORTH & INGERSOLL, PLC; Timothy J. Klima

(57) ABSTRACT

Described is a device for supporting cables for articulated vehicles, designed for installation close to a connecting compartment between two adjacent units of an articulated vehicle, including at least one flexible connecting element fixed to the two units and formed by a series of plates connected to each other by interposing deformable laminar elements consisting of elastic metal elements which allow the elastic deformation of the flexible connecting element, and a series of cable-holder elements joined to respective plates of the flexible connecting element to each define at least one receiving seat provided for housing at least one cable, with supporting means for supporting the flexible connecting element containing the cables.

20 Claims, 8 Drawing Sheets

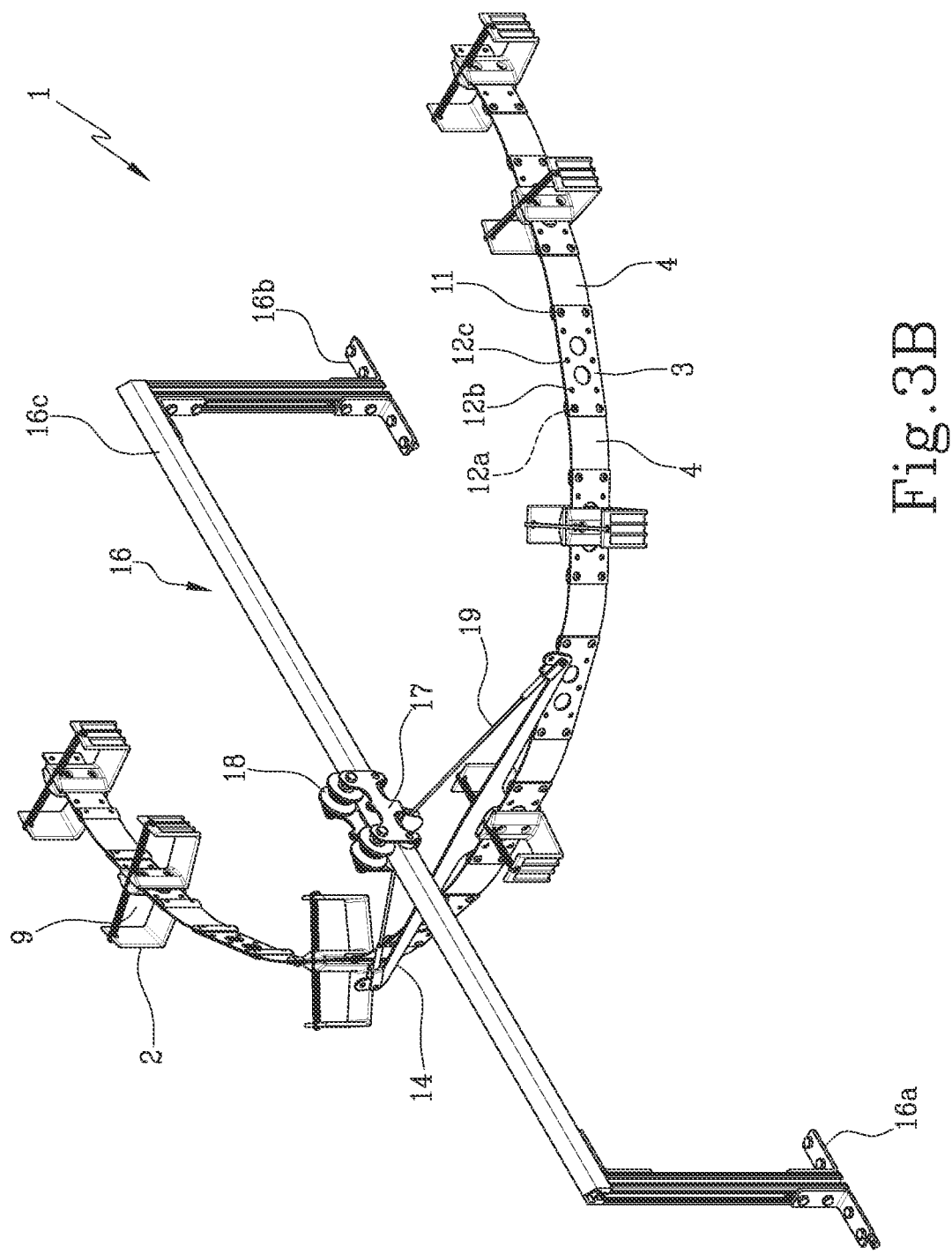

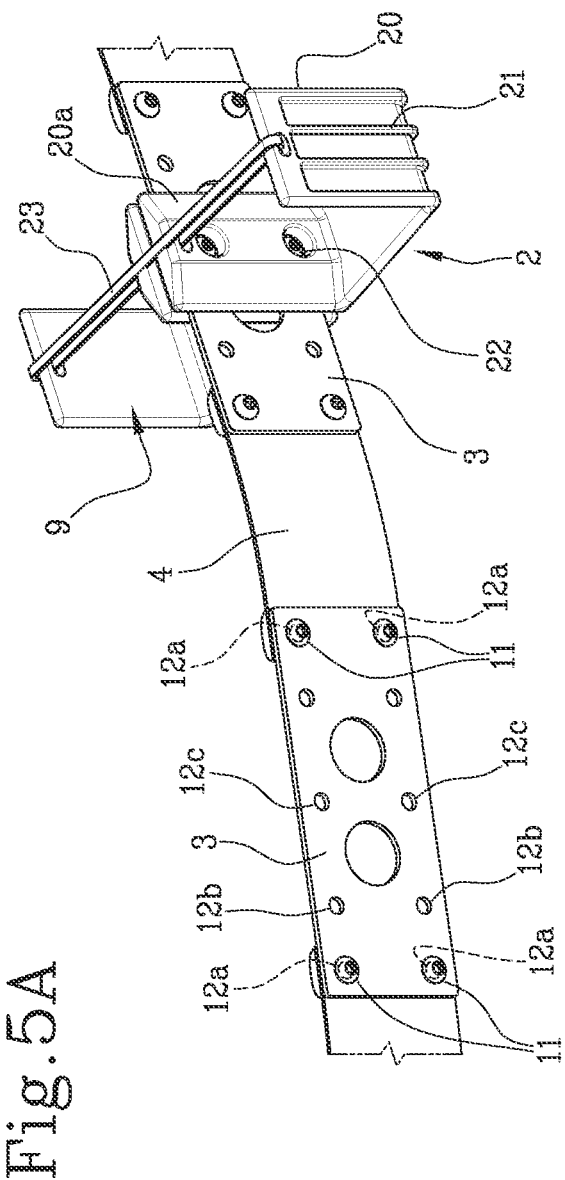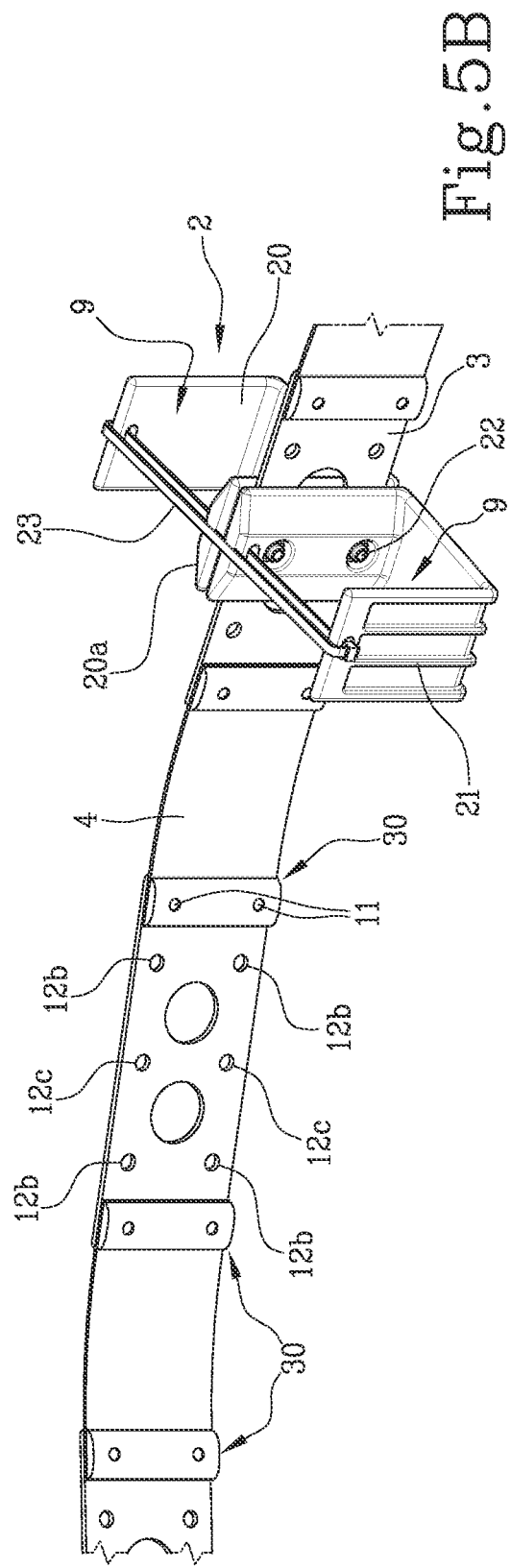

DEVICE FOR SUPPORTING CABLES FOR ARTICULATED VEHICLES

This application claims priority to Italian Patent Application 102021000020978 filed Aug. 3, 2021, the entirety of which is incorporated by reference herein.

BACKGROUND OF THE INVENTION

This invention relates to a flexible device designed for supporting cables in the connecting zone between the units of articulated vehicles, in particular articulated buses, as well as an articulated vehicle fitted with the flexible cable supporting device.

SUMMARY OF THE INVENTION

More specifically, this invention can be advantageously applied in the road sector, in particular for electric vehicles, where the flexible cable supporting device may be installed above or inside (more generally close to) the connecting compartment between the two units, that is to say, the two carriages used for passenger transport, adjacent to each other of an articulated bus.

The connecting compartment is designed to allow passengers to pass between the two units or carriages and there is an articulated device inside the compartment which must allow the articulation between the two units.

In the same way, it must be possible to enable, above or inside (more generally, close to) the compartment, the passage of cables (in particular high voltage electrical lines, low voltage electrical lines and pipes) which connect various user devices present in the rear and/or front unit (for example, signaling and lighting lights, information systems, air conditioning systems, control systems, means for ticketing and/or stamping of travel cards, etc.) with the central panel usually arranged in the front unit, within the driver's reach.

In general, the connecting cables are made to pass through an upper portion of the connecting compartment and housed in special cable-holder devices, which contain them protecting them from impacts and other mechanical stresses.

Although, for simplicity, reference will be made below substantially to a bus, it shall be understood that the invention can also be applied to other articulated vehicles, in which there is a need to make a connection between the cables of the two articulated units.

The characteristics of the cable-holder devices must allow, in addition to the protection, a suitable support of the cables and guarantee for the cables the possibility of following all the movements which the vehicle performs, keeping them in a suitable position on the outside (above or inside) of the connecting compartment but at the same time they must prevent the joint movements between the two units of the vehicle from causing undesired traction or other stresses on the cables.

The rigid cable-holder devices are usually inadequate, especially when steering must be performed or when the vehicle has to rise up or move down slopes, causing a series of mechanical stresses. Consequently, the known cable supporting devices inevitably deteriorate and are damaged in a short time, resulting in the need for frequent repairs and/or replacements.

Cable-holder devices have also been designed which have an articulated structure, thus being able to follow the two units during the movements of the vehicle and compensating for the misalignments, in such a way as to avoid most of the drawbacks of the rigid systems.

However, these articulated systems have complex construction, are expensive, heavy and not easy to assemble and place the cables which they must support.

Firstly, these devices must be structured in such a way as to support the weight force exerted by the cables so as to keep them lying in a predetermined plane, substantially horizontal, approximately parallel to the roof of the vehicle.

In this context, the aim of the invention is to meet the above-mentioned needs by providing a cable-holder device which is able to overcome the drawbacks of the prior art.

In particular, the aim of the invention is to provide a cable-holder device which is able to mechanically withstand the stresses caused by the movement of the vehicle, in particular the stresses caused by the misalignment of the units of the articulated vehicle, irrespective of the type of misalignment which occurs.

A further aim of the invention is to provide a cable supporting device which is able to compensate for the above-mentioned misalignments, distributing the mechanical stresses in a uniform manner to the means for fixing to the two units, thus making the maintenance operations necessary for repair or replacement of the units less frequent, and also of the cables.

These and other aims which will become more apparent in the description below are substantially achieved by a flexible cable supporting device for articulated vehicles as well as by an articulated vehicle mounting the cable supporting device according to the appended claims.

BRIEF DESCRIPTION OF THE DRAWINGS

The features and advantages of the invention will emerge more clearly from the detailed description of a preferred, but not exclusive embodiment of the device.

The device is described below with reference to the accompanying drawings which are provided solely for the purpose of a non-limiting example, in which:

FIGS. 3A and 3B are schematic representations of the cable supporting device of FIG. 1 viewed from different angles;

FIGS. 5A-5C are schematic representations of certain details from the cable supporting device according to the invention;

DESCRIPTION OF THE PREFERRED EMBODIMENTS

With reference to the accompanying drawings, the numeral 1 denotes in its entirety a device for supporting cables for articulated vehicles which, for simplicity of description, will hereafter be referred to as device 1.

In this description, the term "articulated vehicles" is used to mean a means of transport provided with a first and a second unit connected to each other, for example a bus or a similar vehicle (road or rail).

Figure 1:
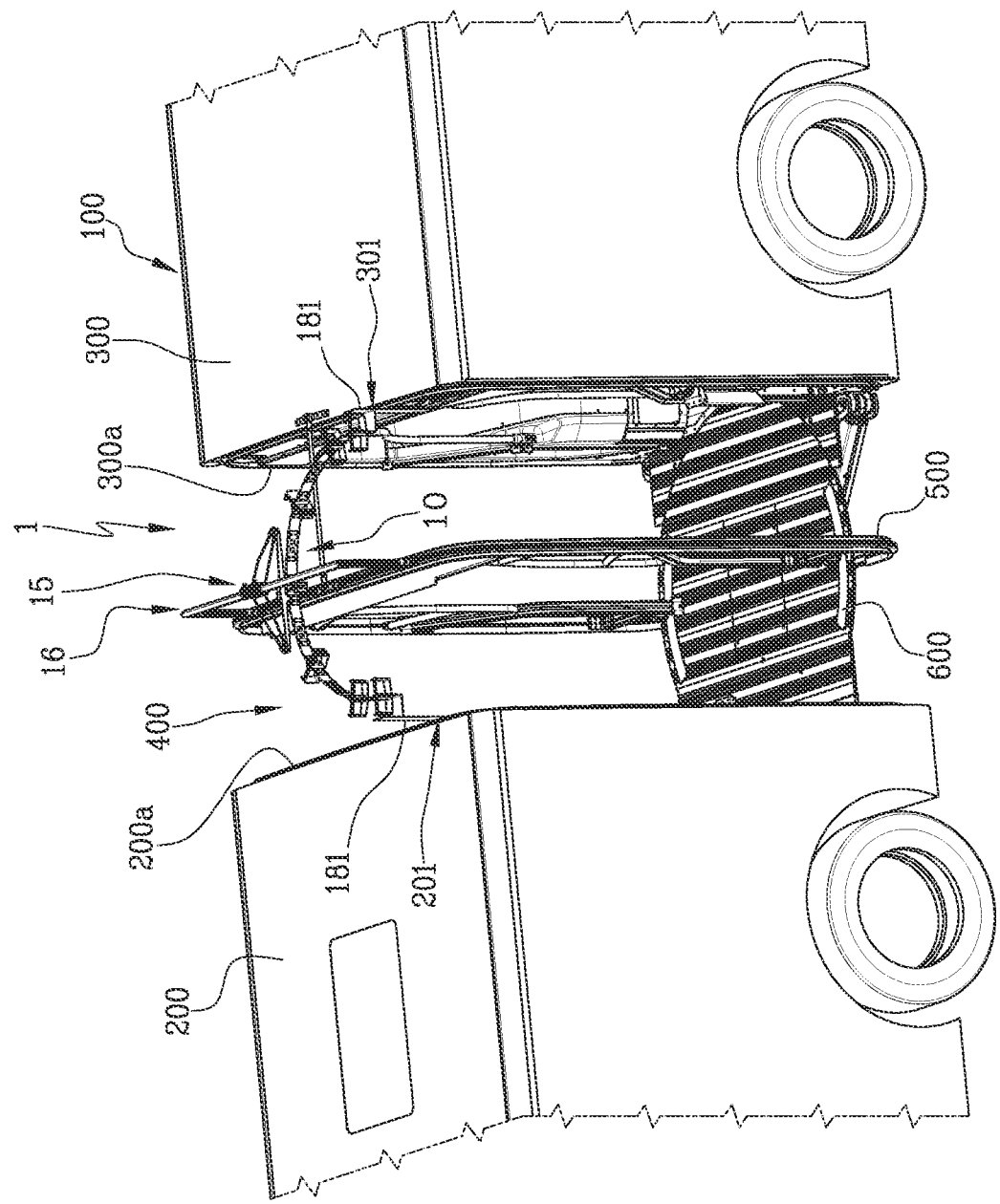
FIG. 1 schematically illustrates of an outer view of an articulated vehicle mounting the cable supporting device according to the invention.

FIG. 1 schematically shows a portion of an articulated vehicle 100 having two units used for passenger transport 200, for example front, and 300, for example rear, between which a connecting compartment 400 is interposed, designed to allow the passage of the passengers from one unit to another.

In particular, the passage is allowed thanks to a rotary platform 600, which joins the treadable surface of one unit with that of the other unit, practically in an uninterrupted fashion, but allowing the rotation between the two units. It is not uncommon for this platform to also carry passengers who remain on it.

In the case of the bus, the connecting compartment 400 is generally protected by a concertina cover (not illustrated in the drawings) which joins the spaces inside the two units 200 and 300, and which is fixed to the end portions 200a and 300a of the two units 200 and 300, also in this case allowing rotation and, in general, misalignment in all directions between the latter.

In other words, in use, the two units 200, 300 can move relative to each other, becoming misaligned. Generally speaking, it is seen that there is a misalignment between the two units every time the head unit changes its direction of travel, especially on account of the shape of the ground.

Preferably, the device 1 is installed in an upper portion of, or inside, the connecting compartment 400, above or inside the covering of the connecting compartment 400.

More generally speaking, it should be noted that the device 1 is installed in the proximity of the connecting compartment 400 (at the top or inside).

Figure 2:
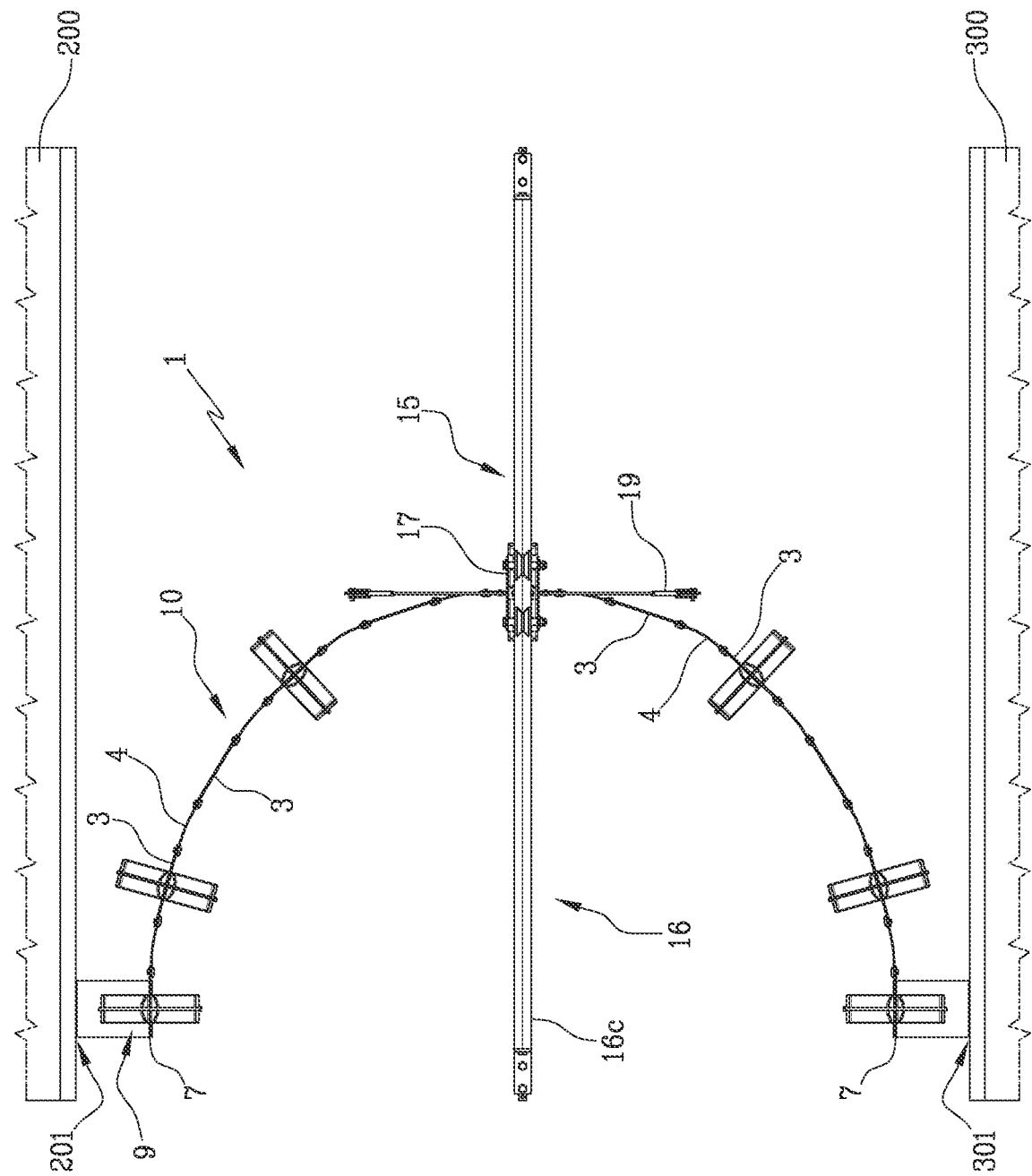
FIG. 2 is a schematic plan view of the cable supporting device of FIG. 1.
Figure 3A:
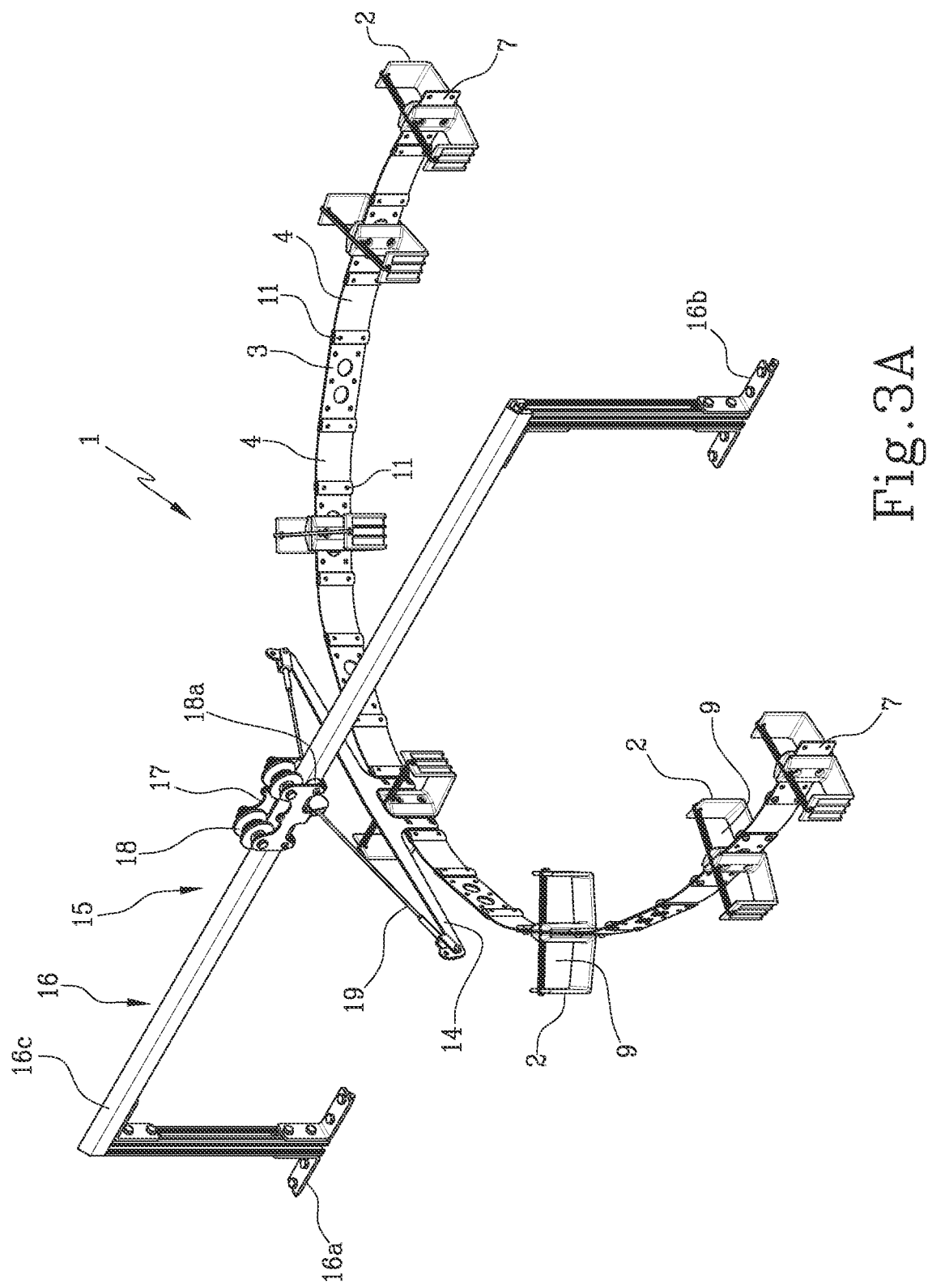
Figure 4:
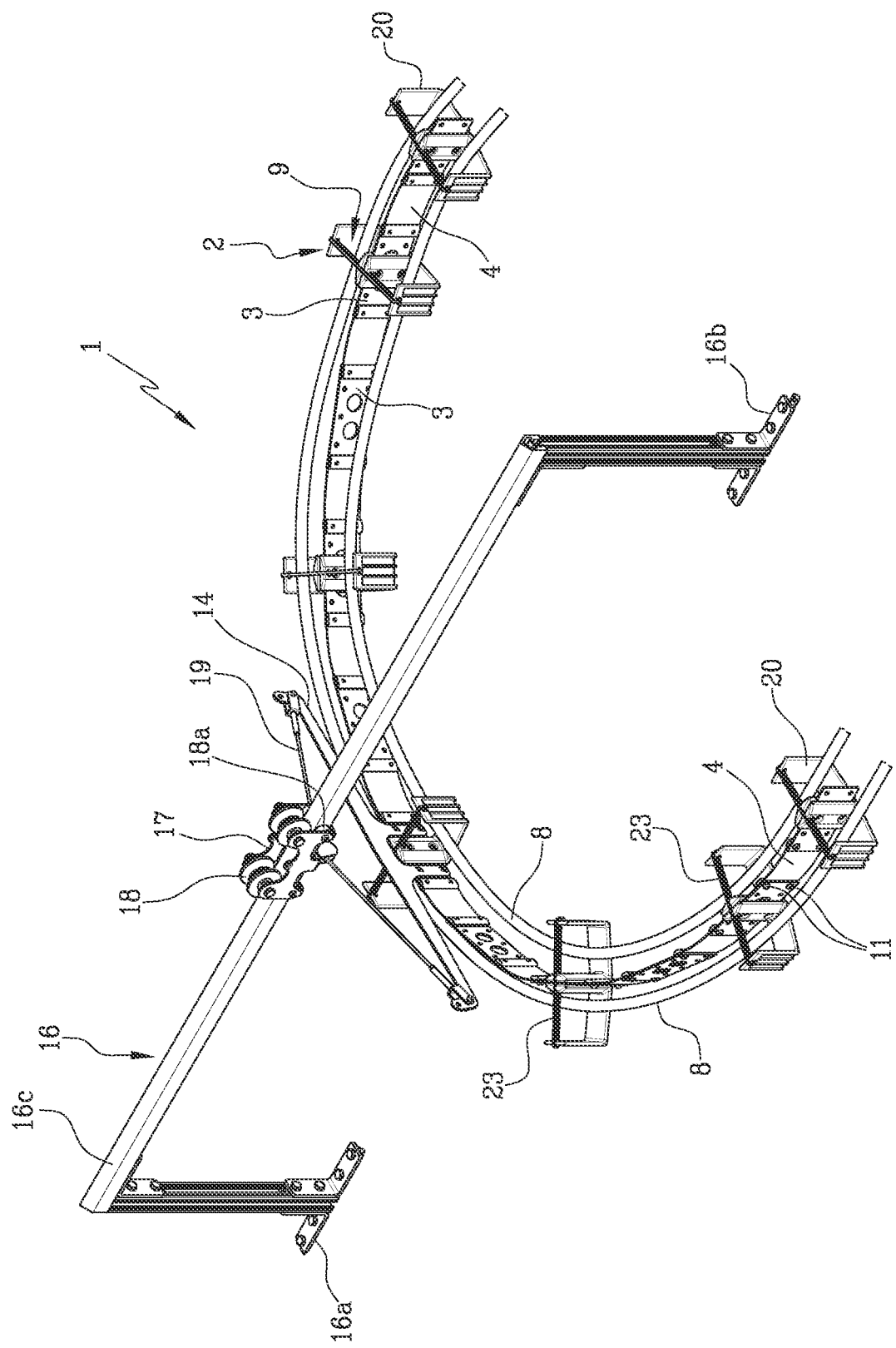
FIG. 4 shows the same cable supporting device of FIG. 1, in which two of the numerous cables which it is able to support have been positioned, by way of example.

With reference to FIGS. 2 to 4, according to the preferred embodiment the device 1 comprises at least one flexible connecting element 10 which is fixed to the corresponding and facing end portions 200a, 300a of the two units 200 and 300.

Preferably, as shown in FIG. 2, the two ends 7 of the flexible connecting element 10 are advantageously rigidly fixed at coupling points 201 and 301 to the units 200 and 300, so as to position the flexible connecting element in a raised position relative to the upper wall of the units 200 and 300, but other positions could be equally suitable without affecting the scope of the invention.

It should be noted that FIG. 1 schematically illustrates, labelled 181, fixing elements rigidly connected to the units 200, 300 and to the ends 7 of the flexible connecting element 10.

Preferably, the flexible connecting element 10 is formed by a series of plates 3 connected to each other by interposing deformable laminar elements 4, as shown in FIGS. 3a, 3b and 4, which illustrate the device according to the invention in different views and in different conditions.

It should be noted that said deformable laminar elements 4 and plates 3 define a succession along a main direction of extension of said flexible connecting element 10, in such a way that each deformable laminar element 4 is adjacent to at least one plate 3.

More preferably, said succession comprises at least three deformable laminar elements 4 and at least two plates 3.

It should also be noted that, the first laminar element 4 is followed by a first plate 3, connected respectively to a second laminar element 4, which is followed by a second laminar element 4: consequently, laminar elements 4 with plates 3 alternate along the extension of the flexible element 10.

In more detail, the deformable laminar elements 4 each consist of a deformable sheet (elastic), made of metal or, more generally, made of plastically deformable material.

Figure 5C:
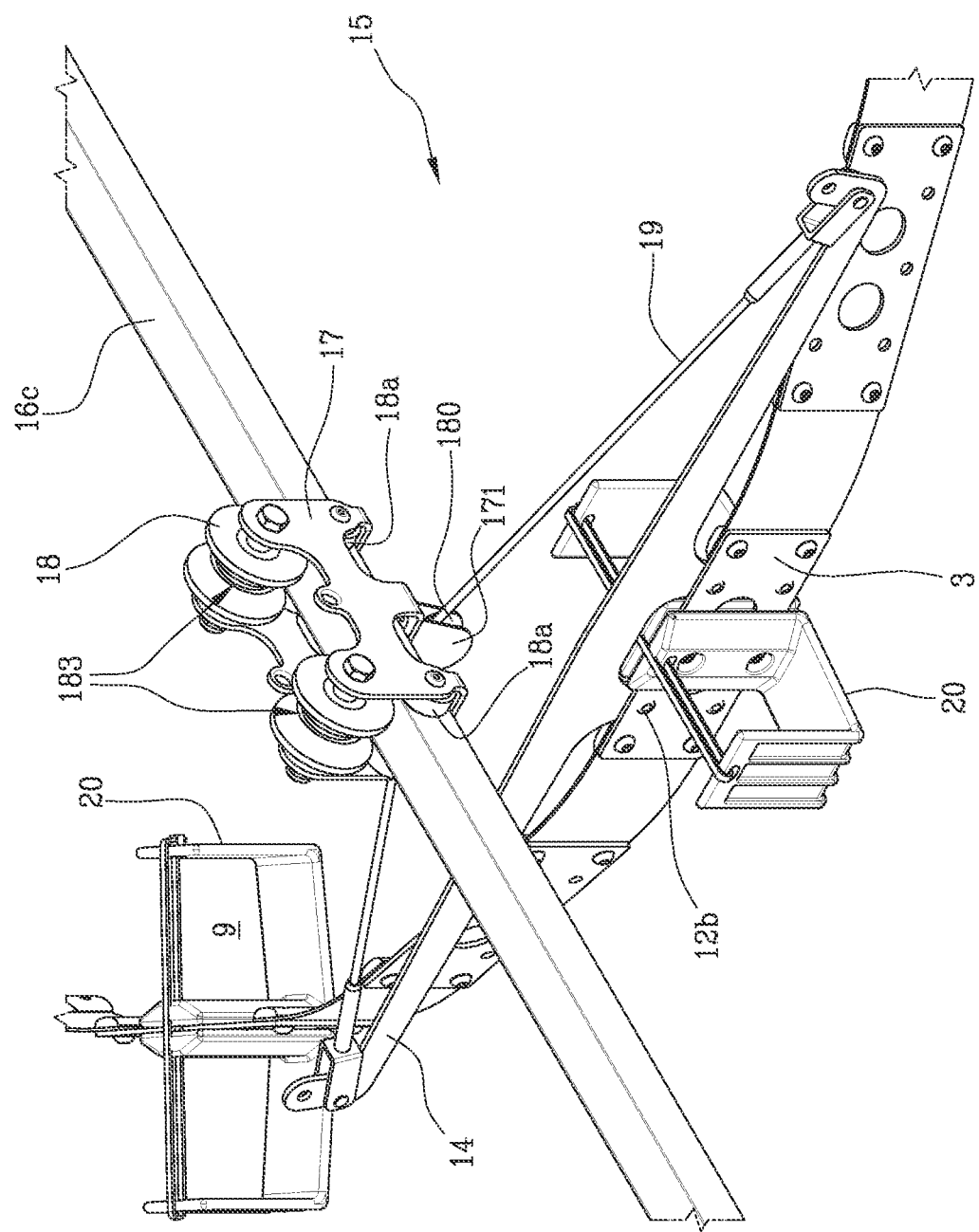

According to an aspect, the deformable element 4 is joined to the corresponding plates 3 by means of plates 30 each coupled to a respective element 4 and plate 3 by means of screws 11, or advantageously rivets, which pass through corresponding holes 12a made in said plates 3 produced in pairs located in outermost positions in the longitudinal direction of the plates (FIG. 5A).

In the plates there are other pairs of holes 12b and 12c, the function of which will be described in more detail below.

The deformable elements 4 joined to the plates 3 allow the elastic deformation of the flexible connecting element 10, which can therefore adapt to the variations in position imposed by the misalignments and by the rotations of the units 200 and 300 during the movement of the vehicle.

For this purpose, the flexible connecting element 10 preferably has a length greater than the minimum distance between the coupling points 201 and 301 of the two units 200 and 300, and therefore adopts an extension which follows a curvilinear path.

Advantageously, the curvilinear path of the flexible connecting element 10 extends in the form of an arc of a circle, as shown clearly in FIG. 2 in the plan view of the device 1, for example with an amplitude of 180°.

This geometry advantageously and substantially influences the performance of the flexible connecting element 10.

Preferably, the plates 3 of the flexible connecting element 10 are associated with respective cable-holder elements 2, which each define a receiving seat 9 provided for housing one or more cables 8, as shown in FIG. 4.

Preferably, the cable-holder elements 2 each comprise a flat segment 20 shaped in the form of a "U", designed to define a receiving seat 9 and joined with one of the vertical branches 20a to a corresponding plate 3.

It should be noted that the U-shaped flat segments 20 are preferably provided with reinforcement ribs 21.

The shaped flat segments 20 can be joined to the plates 3 in pairs, one on each side, as clearly shown in FIGS. 5A and 5B.

The joining between the U-shaped flat segments and the respective plates 3 is obtained by fixing one of the vertical branches 20a of each U-shaped flat segment 20 to a corresponding plate 3 preferably using screws or rivets 22, which pass through pairs of corresponding holes 12c of the plate 3.

The holes 12c passed through by the screws 22 (or rivets) are the innermost central holes of the plates 3. Preferably, each screw (or rivet) may engage the vertical branches 20a of two U-shaped flat segments 20 with interposing of the plate 3, which remains clamped between the pair of segments 20, stabilizing the joining.

There may also be means 23 for containing the cables 8, which may consist, for each cable-holder element 2, of a rigid or elastic ring which is made to pass through slots or holes made preferably at the top of the free ends of the U-shaped segments 20, as clearly shown in FIGS. 5A and 5B.

The function of the containment means 23 is to close or limit the top of the receiving seat 9 preventing the cables 8 from coming out of it.

Since the deformable plates 4 allow the deformability of the flexible connecting element 10, the latter could also oscillate downwards, in an uncontrolled or unwanted manner.

In order to avoid that and to keep the flexible connecting element 10 lying in a predetermined plane substantially horizontal, or rather approximately parallel to the roof of the two units 200 and 300, there are supporting means 15 which support the flexible connecting element 10 acting on a relative intermediate portion, as described in more detail below.

Preferably, the supporting means 15 comprise a frame 16 in the shape of an inverted "U", fixed resting on the terminal ends 16a, 16b of the respective vertical branches on a load-bearing structure 500, which is provided in the connecting compartment 400 and which is preferably integral with the platform 600 connecting the two units 200, 300.

The load-bearing structure 500 is designed to support the concertina cover, determining and maintaining the correct position relative to the platform 600 during the movements of the vehicle.

A carriage 17 is slidably supported along the intermediate crosspiece 16c of the frame 16, which connects the two vertical branches, thanks to a series of rotatable rollers 18 resting on it and with runners 18a which slide on the intermediate crosspiece 16c of the frame 16, in particular along the lateral surfaces (to prevent the carriage 17 from inclining laterally).

Preferably, the rollers 18 of the carriage 17 have a groove 183 along their outer circumference, into which the apex of the intermediate crosspiece 16c of the inverted U-shaped frame 16 is introduced.

The carriage 17 supports the flexible connecting element 10.

More specifically, the carriage 17 is joined to an intermediate part of the flexible connecting element 10, preferably through one or more cables 19 fixed at the ends to the carriage 17 and at a fork 14 joined to one of the plates 3.

The fork 14 is joined with the central part to a plate 3, for example by screws which pass through the remaining pairs of holes 12b situated between the pairs of central holes 12c provided for fixing the cable-holder elements 2 and the pairs of outermost holes 12a, provided for the connection between the plates 3 and the elastic elements 4.

It should be noted that this arrangement is purely by way of an example and may be completely different, without affecting the scope of the invention.

Generally speaking, there is a cable 19 (labelled 191) whose ends are fixed to corresponding ends of the fork 14 and made to slide through a rotatable pulley 180 between the lobes 171 which extend downwards from the carriage 17.

The cable 191 moving on the rotatable pulley allows the cable-holder device 1 to be able to also move in a longitudinal direction relative to the vehicle (it should be noted that in the transversal direction, with respect to the vehicle, the movement is already made possible by the movement of the carriage 17 along the crosspiece 16c).

This is particularly important in some operating conditions, for example in ascent and descent of the vehicle, to allow the cable-holder device 1 to move towards/away from the carriages.

Thanks to this constructional configuration, the carriage 17 moving along the intermediate crosspiece 16c of the frame 16 supports the flexible connecting element 10 and accompanies it in the bending which it adopts during the movement of the vehicle, when the two units 200 and 300 rotate or in any case are misaligned relative to each other, keeping the flexible connecting element 10 substantially in the predetermined plane.

Figure 5D:
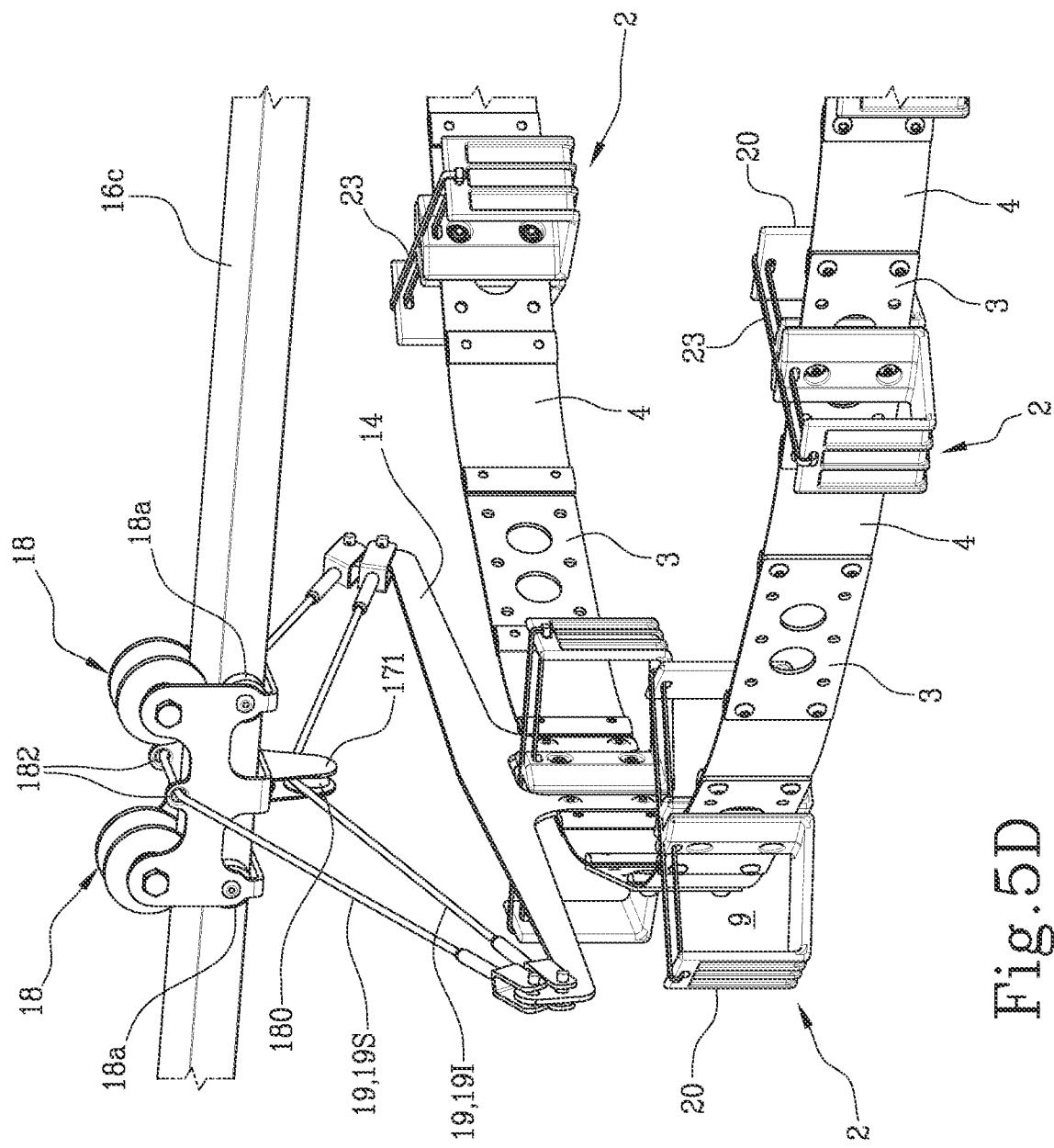
FIG. 5D illustrates a further embodiment of the device according to the invention.

Optionally, there may be a second (safety) cable, above the carriage 17 (labelled 19S in FIG. 5D).

The cable 19S passes through holes 182 provided in the carriage 17.

It should be noted that the frame 16 has a supporting function: it does not in any way guide the flexible connecting element 10 and is configured in such a way as to allow an easy but supported movement of the flexible connecting element 10 in the predetermined horizontal plane defined above.

As mentioned above, each terminal end 7 of the flexible connecting element 10 is applied rigidly to the terminal portions 200a, 300a of the units 200, 300 of the articulated vehicle 100, preferably above, in particular at a coupling point 201 and 301.

However, it will be understood that the application of the ends 7 may also be performed in other zones considered suitable, or at different heights, without adversely affecting the originality of the invention.

The terminal ends 7 of the flexible connecting element 10, shown in FIGS. 2 and 3A-B, are attached to the respective unit (200, 300).

As already mentioned, in use, the flexible connecting element 10 is installed in such a way that its line of extension is curved, preferably arched.

In other words, the plates and the elastic elements remain positioned in use to define, in their entirety, a curvilinear shape, preferably an arc.

This geometry directly and substantially influences the performance of the flexible connecting element 10.

Advantageously, in effect, thanks to this curvature, the flexible connecting element 10 can adapt to the relative movements between the units 200 and 300 during normal operations of the articulated vehicle 100, without causing unwanted stresses both on the cables 8 and on the same flexible connecting element 10.

Further, the zones where the flexible connecting element 10 is joined to the units 200 and 300 are also protected against harmful stresses that might negatively affect stability in a short time.

It should be noted that the cable passing inside the seats 9 of the cable-holder elements 2 may be an electrical cable, but also any other cable or pipe designed to convey a fluid, liquid or air, etc.

As may be clearly inferred from the drawings, the supporting device 1 can absorb (reduce) the stresses (tensions) deriving from the misalignment of the units 200, 300 irrespective of the plane in which they occur and adapt without damage to the various reciprocal configurations adopted by the units 200, 300.

The invention also relates to an articulated vehicle 100, in particular a bus, comprising two adjacent units 200, 300 separated from each other by a compartment 400 and comprising the cable supporting device 1 (positioned above the connecting compartment 400).

The articulated vehicle 100 also comprises cables (electrical or pipes designed to allow the passage of a fluid, air or liquid).

In particular, each end 7 of the at least one flexible connecting element 10 is applied above a respective unit 200, 300.

Advantageously, the device 1 and the articulated vehicle 100 described above are able to overcome the drawbacks of the prior art.

In effect, the cable supporting device 1 is able to withstand the mechanical stresses caused by the travel of the articulated vehicle 100 thanks to the deformable elastic structure of the flexible connecting element 10 obtained by means of the elastic elements 4 which connect the plates 3.

This shape allows the at least one flexible connecting element 10 to be oriented relative to the units 200, 300 (in this way reducing the stresses).

What is claimed is:

1. A device for supporting cables for an articulated vehicle and configured for installation above a connecting compartment between two adjacent units articulated to each other of the articulated vehicle, said device being provided for supporting cables above, or inside, the connecting compartment between said two adjacent units, said device comprising:
- at least one flexible connecting element fixed to corresponding ends of said two adjacent units and formed by a series of plates connected to each other by interposing a plurality of deformable laminar elements, configured to allow elastic deformation of said at least one flexible connecting element;
- a series of cable-holder elements joined to respective ones of the plates of said at least one flexible connecting element and each defining at least one receiving seat provided for housing at least one cable.

2. The device according to claim 1, wherein said deformable laminar elements and plates define a succession along a main direction of extension of said at least one flexible connecting element, such that each of the deformable laminar elements is adjacent to at least one of the plates.

3. The device according to claim 2, wherein said succession comprises at least three of the deformable laminar elements and at least two of the plates.

4. The device according to claim 1, and further comprising supporting means configured to support said at least one flexible connecting element.

5. The device according to claim 1, wherein said at least one flexible connecting element has a length greater than a minimum distance between the corresponding ends of said two adjacent units and extends along a curvilinear path.

6. The device according to claim 5, wherein said curvilinear path is arc-shaped.

7. The device according to claim 1, wherein said deformable laminar elements each comprise at least one deformable sheet, joined to corresponding ones of the plates.

8. The device according to claim 7, wherein said at least one deformable element is joined to the corresponding ones of the plates by screws or rivets, which selectively pass through corresponding holes in said plates.

9. The device according to claim 1, wherein said cable-holder elements joined to respective ones of the plates each comprise at least one U-shaped flat segment, configured to form a receiving seat.

10. The device according to claim 9, wherein said at least one U-shaped flat segment is joined by one of two vertical branches thereof to a corresponding one of the plates.

11. The device according to claim 9, wherein said U-shaped flat segments are provided with reinforcement ribs and are joined, in pairs one on each side, by one of the vertical branches to a corresponding one of the plates, the device further comprising containment means for containing the cables fixed to free ends of said U-shaped segments for closing a top of said receiving seat.

12. The device according to claim 11, wherein said containment means comprise, for each of the cable-holder elements, at least one rigid or elastic ring which passes through slots or holes made at tops of the free ends of said U-shaped segments.

13. The device according to claim 4, wherein said supporting means comprise a U-shaped frame shaped as an inverted "U" fixed resting on terminal ends of the respective vertical branches on a load-bearing structure provided above said connecting compartment and integral with a platform for connecting between the two adjacent units.

14. The device according to claim 13, and further comprising at least one carriage, slidably supported along said U-shaped frame and configured to support said at least one flexible connecting element.

15. The device according to claim 14, wherein said at least one carriage slides along said U-shaped frame via a series of first rotatable rollers resting on an intermediate crosspiece of the U-shaped frame which connects two vertical branches thereof and is joined to an intermediate part of said at least one flexible connecting element by one or more cables coupled at ends thereof to said at least one carriage and to at least one fork joined to one of said plates, to keep said at least one flexible connecting element lying substantially in a horizontal plane.

16. The device according to claim 15, wherein there is a single cable having the ends thereof fixed at corresponding ends of said fork and made slidable between a pulley rotatably interposed between lobes which extend downwards from the at least one carriage.

17. The device according to claim 15, wherein said first rotatable rollers of said at least one carriage each have a groove formed along their outer circumference, in which an apex of the intermediate crosspiece of said U-shaped frame is introduced and the at least one carriage comprises runners which allow the at least one carriage to slide along the intermediate crosspiece, sliding on lateral surfaces of the intermediate crosspiece of the U-shaped frame.

18. The device according to claim 1, wherein said at least one flexible connecting element is fixed to the two adjacent units at the corresponding ends by rigid elements, positioned above or inside said two adjacent units.

19. An articulated vehicle, comprising:
the device according to claim 1,
the two adjacent units adjacent to each other separated by the connecting compartment,
wherein the device is installed above, or inside, the connecting compartment between the two adjacent units.

20. The articulated vehicle according to claim 19, wherein said at least one flexible connecting element is applied above, or inside, each respective one of the two adjacent units, rigidly connected to the two adjacent units at the corresponding ends.

* * * * *